(12) United States Patent
Ueda et al.

(10) Patent No.: US 8,116,440 B2
(45) Date of Patent: Feb. 14, 2012

(54) TRANSMITTING APPARATUS AND TRANSMITTING METHOD

(75) Inventors: Suehiro Ueda, Nara (JP); Syoichiro Yoshiura, Nara (JP); Tsutomu Yoshimoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1384 days.

(21) Appl. No.: 11/713,365

(22) Filed: Mar. 1, 2007

(65) Prior Publication Data

US 2007/0206574 A1 Sep. 6, 2007

(30) Foreign Application Priority Data

Mar. 2, 2006 (JP) ................................. 2006-056585

(51) Int. Cl.
*H04M 11/00* (2006.01)
(52) U.S. Cl. ......... 379/100.06; 379/100.17; 379/100.01; 358/1.15; 358/400
(58) Field of Classification Search ............. 379/100.06, 379/100.01, 100.02, 100.05, 100.14, 354, 379/355.01, 904; 358/1.15, 405, 407, 440
See application file for complete search history.

(56) References Cited

U.S. PATENT DOCUMENTS

| 2003/0128402 | A1* | 7/2003 | Tanimoto | 358/402 |
| 2004/0017581 | A1* | 1/2004 | Quintana et al. | 358/1.15 |

FOREIGN PATENT DOCUMENTS

| JP | 03-129950 | 6/1991 |
| JP | 04-162872 | 6/1992 |
| JP | 11-008714 | 1/1999 |
| JP | 11-215341 | 8/1999 |
| JP | 2000-151957 | 5/2000 |
| JP | 2004-214710 | 7/2004 |

* cited by examiner

*Primary Examiner* — Melur Ramakrishnaiah
(74) *Attorney, Agent, or Firm* — David G. Conlin; Steven M. Jensen; Edwards Wildman Palmer LLP

(57) ABSTRACT

When a transmission of image data to a destination has not been completed, retransmission processing in which the image data is repeatedly transmitted to the destination is performed and the number of times the transmission has been performed is counted. When the number is higher than a predetermined value, the sender is informed about the occurrence of transmission error and whether the modification of destination information has been requested is determined. When the modification has been requested, the destination information is modified; when the modification has not been requested, the destination information is deleted and then the deletion of the destination information is informed. When stored destination information including destinations of data is wrong, the use of the destination information is inhibited, which prevents users as recipients from feeling displeasure.

10 Claims, 12 Drawing Sheets

FIG. 3

DESTINATION ADDRESS/ONE-TOUCH

No. 024

ADDITIONAL REGISTRATION

OK

☑ FAX   ☐ INTERNET FAX

DESTINATION NAME    SEARCH CHARACTER

INDEX    ADDRESS

KEY ITEM    FORMAT

FIG. 8

```
┌─────────────────────────────────────────────────┐
│  DESTINATION ADDRESS/ONE-TOUCH                  │
│                      ┌──────────────┐ ┌──────┐  │
│   No. 024            │ ADDITIONAL   │ │  OK  │  │
│                      │ REGISTRATION │ │      │  │
│                      └──────────────┘ └──────┘  │
│      ☑ FAX        ☐ INTERNET FAX                │
│                        ABC           SEARCH     │
│   ▓DESTINATION NAME▓   CORPORATION   CHARACTER A│
│   INDEX  a/d  ADDRESS  0000-00-0000             │
│   KEY ITEM  ABC CORPORATION                     │
└─────────────────────────────────────────────────┘
```

TRANSMITTING APPARATUS AND TRANSMITTING METHOD

CROSS-REFERENCE TO RELATED APPLICATION

This Nonprovisional application claims priority under 35 U.S.C. §119(a) on Paten Application No. 2006-56585 filed in Japan on Mar. 2, 2006, the entire contents of which are hereby incorporated by reference.

BACKGROUND OF THE INVENTION

The present invention relates to a transmitting apparatus provided with a one-touch dialing function capable of storing information on the destinations of data in advance, eliminating the input of the destination information done every time transmissions are made, and simplifying transmitting operations and to a transmitting method for the apparatus.

With the recent enhanced speed of information processing and increased amount of information as epitomized by the Internet, digital multifunction machines, facsimile machines, or the like having scanner function, printer function, facsimile function, mail transmitting function, and so on have been connected with information communication terminals such as other digital multifunction machines or personal computers used at distant locations via networks, communication lines, or the like and have been shared by many users.

In such digital multifunction machines or facsimile machines, one-touch dialing function is provided. The reason why the one-touch dialing is provided thereto is that when image data obtained through the utilization of scanner function, external personal computers, or the like is transmitted to distant locations by means of FAX or mail transmissions, destination information such as the telephone numbers, e-mail addresses, names of destinations is registered and stored in advance in order to save users time and effort required for inputting such information every time transmissions are made, thereby destinations can be easily set from among the stored destination information at the time of transmissions.

Furthermore, Japanese Patent Application Laid-Open No. 2004-214710 (Patent Reference 1) has disclosed a facsimile machine capable of finding the FAX number of a desired destination in a short time by registering destination information in such a way that they are classified into categories such as the names of companies, addresses, names, telephone numbers, FAX numbers, and mail addresses.

Moreover, in a facsimile machine disclosed in Japanese Patent Application Laid-Open No. 2000-151957 (Patent Reference 2), when sender information from a communicating party is compared with prestored destination information at the time of reception of facsimile and then destination information matching the sender information is present, whether the reception of the facsimile has been suitably made is found by transmitting the result of the reception to the sender after the completion of the reception, thereby convenience for users can be enhanced.

BRIEF SUMMARY OF THE INVENTION

In the facsimile machines disclosed in Patent References 1 and 2, a destination is set (or selected) from plural pieces of prestored destination information by using a one-touch dialing function and then image data is transmitted thereto. However, when wrong destination information is registered and stored, image data cannot be transmitted and a destination who has received the wrong transmission is troubled. For example, when a piece of registered destination information is not a FAX number but a telephone number, a sender's apparatus (such as a digital multifunction machine or a facsimile machine) is unable to transmit image data and thus performs dialing repeatedly. Therefore, when the recipient has picked up the receiver on a ringing tone, carrier sounds of facsimile communications are heard, which has caused problems that the user as the recipient not only feels displeasure but cannot deal with such trouble.

The present invention has been accomplished in view of such circumstances, and therefore it is an object of the invention to provide a transmitting apparatus which selects a destination based on plural pieces of stored designation information and which is capable of preventing a receiving user from feeling displeasure by inhibiting making a transmission of data to the selected destination after it is determined that the transmission to the selected destination has not been completed and by inhibiting the use of destination information when the destination information has been stored by mistake, and a transmitting method for the transmitting apparatus.

Further, another object of the invention is to provide a transmitting apparatus having a function that when it is determined that a transmission to a destination has not been completed and then the transmission has not been completed despite the fact that retransmission has been made a predetermined number of times, a transmission to the destination is prohibited and it can be determined that stored destination information is surely wrong, and a transmitting method for the apparatus.

Still further, another object of the invention is to provide a transmitting apparatus having a function that when transmission error information indicating that a destination is wrong is received at the time of data transmission, a transmission to the destination is inhibited and it becomes possible to prevent the repeated use of the wrong destination information, and a transmitting method for the apparatus.

Furthermore, another object of the invention is to provide a transmitting apparatus having a function that only correct destination information can be stored by providing a deleting unit which deletes destination information including a destination to which a transmission is inhibited, and a transmitting method for the apparatus.

Moreover, another object of the invention is to provide a transmitting apparatus having a function that it is possible to prevent correct destination information from being deleted by mistake by not deleting destination information including a destination whose line is busy, and a transmitting method for the apparatus.

In addition, another object of the invention is to provide a transmitting apparatus capable of making users realize that wrong destination information is present by providing an informing unit that informs that a transmission to a destination is inhibited, and a transmitting method for the apparatus.

The transmitting apparatus according to the invention is provided with storage means for storing plural pieces of destination information including destinations of data, selecting means for selecting a destination based on the stored destination information, transmitting means for transmitting data to the selected destination, determining means for determining whether the transmission to the destination has been completed, and inhibiting means for inhibiting a transmission to the destination after it is determined at the determining unit that the transmission has not been completed.

According to the invention, it is determined whether a data transmission to a destination selected based on the plural pieces of stored destination information has been completed.

When it is determined that the transmission has not been completed, a transmission to the destination is inhibited by determining that the stored destination information is wrong. Therefore, when wrong destination information is stored, the use of the destination information is inhibited. When a destination is selected based on the plural pieces of stored destination information and then it is determined that the data transmission to the selected destination has not been completed, a transmission to the destination is inhibited. Thus, when wrong destination information is stored, the use of the destination information is inhibited, which makes it possible to prevent users as recipients from feeling displeasure.

In the transmitting apparatus according to the invention, when it is determined at the determining means that the transmission has not been completed, control means controls the transmitting means in order to perform retransmission. When the transmission to the destination has not been completed despite the fact that the transmission has been repeated a predetermined number of times, the inhibiting means inhibits a transmission to the destination. According to the invention, when it is determined that the transmission to the destination has not been completed, the transmission is controlled in order to make a retransmission to the destination; however, when the transmission to the destination has not been completed despite the fact that the retransmission has been repeated the predetermined number of times, a transmission to the destination is inhibited. By repeating the transmission the predetermined number of times, it is surely determined that the stored destination information is wrong. In a case where even when retransmission has been made a predetermined number of times based on the determination that the transmission to the destination has not been completed, the transmission has not been completed, a transmission to the destination is inhibited, which makes it possible to determine that stored destination information is surely wrong.

The transmitting apparatus according to the invention is provided with receiving means for receiving transmission error information indicating that a destination is wrong at the time of data transmission. When the receiving means receives the transmission error information, the inhibiting means inhibits a transmission to the destination. According to the invention, when a destination to which data has been transmitted is wrong, transmission error information indicating the destination is wrong is received, following which a transmission to the destination is inhibited. Therefore it is possible to prevent wrong destination information from being repeatedly used.

The transmitting apparatus according to the invention is provided with deleting means for deleting destination information including the destination at the time of the inhibition of a transmission to the destination. According to the invention, when a transmission to the destination is inhibited, destination information including the destination is deleted. Therefore only correct destination information can be stored.

The transmitting apparatus according to the invention is provided with detecting means for detecting that the line of a destination is busy. When the line of the destination is busy, the deletion of destination information including the destination is not made. In this invention, the detecting means detects that the line of a destination is busy; when the line of the destination is busy, the deletion of destination information including the destination is not made. Therefore it is possible to eliminate cases where destination information is deleted by mistake because the line is busy despite the fact that the destination information is correct.

The transmitting apparatus according to the present invention is provided with informing means for informing that a transmission to the destination has been inhibited at the time of the inhibition of the transmission. In this invention, when a transmission to the destination is inhibited, the informing means informs the user of the inhibition of the transmission, which makes it possible to make the user realize that wrong destination information is present.

The above and further objects and features of the invention will more fully be apparent from the following detailed description with accompanying drawings.

BRIEF DESCRIPTION OF THE SEVERAL VIEWS OF THE DRAWINGS

FIG. 3 is a schematic illustration of an example of a screen display;

FIG. 8 is a schematic illustration of an example of a screen display;

DETAILED DESCRIPTION OF THE INVENTION

Figure 1:
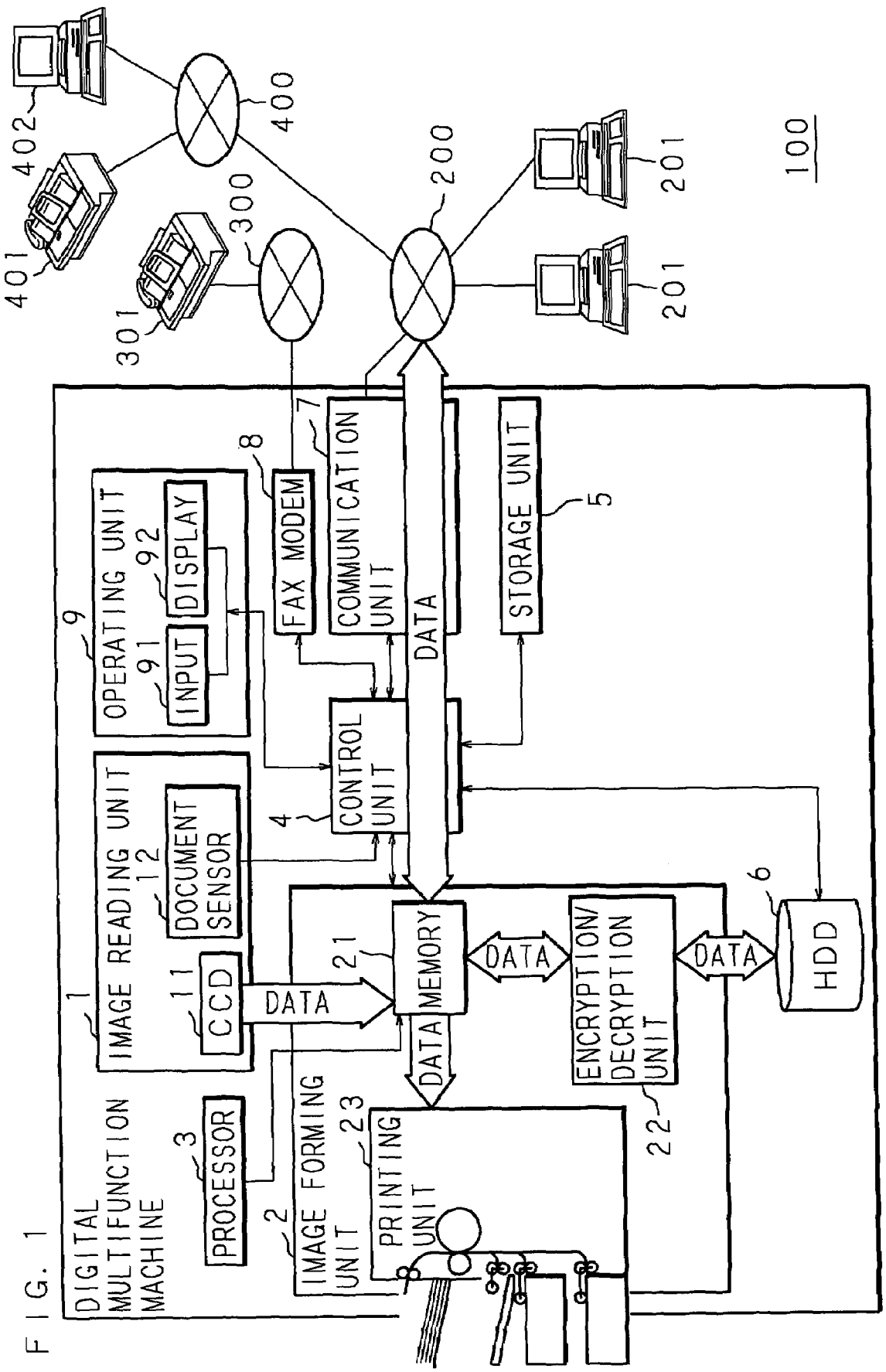
FIG. 1 is a block diagram of an internal configuration of a digital multifunction machine.

An embodiment according to the present invention will be described below in detail with reference to the accompanying drawings. FIG. 1 is a block diagram of an internal configuration of a digital multifunction machine 100 provided with a transmitting apparatus according to the invention. As shown in FIG. 1, the digital multifunction machine 100 is provided with an image reading unit 1, an image forming unit 2, a processor 3, a control unit 4, a storage unit 5, a HDD 6, a communication unit 7, a FAX modem 8, and an operating unit 9, and so on.

The image reading unit 1 is provided with a CCD 11, a document sensor 12, and so on. At the image reading unit 1, a document placed on a document feeder tray is sensed by the document sensor 12 and then irradiated with light while being conveyed along a conveying path by means of an automatic document feeder (ADF). Thereafter, reflected light from the document is photoelectrically converted by the CCD 11 into an analog signal, following which the resulting analog signal is converted to a digital signal by means of an A/D converter (not shown). The image reading unit 1 outputs the digital signal to the image forming unit 2 as image data.

The image forming unit 2 is provided with a memory 21, an encryption/decryption unit 22, a printing unit 23, and so on. The image data outputted from the image reading unit 1 is temporarily stored in the memory 21. The image forming unit 2 reads the stored image data therefrom, the read image data is subjected to an editing process comprising a print density converting process, a scaling process, Nin 1, and so forth at the processor 3, after which the image data is inputted to the encryption/decryption unit 22.

The encryption/decryption unit 22 encrypts the image data by using a predetermined scheme and then the encrypted data is outputted to the HDD 6. And further, the encryption/decryption unit 22 decrypts encrypted data inputted from the HDD 6 into its original image data and then outputs the decrypted image data to the memory 21.

The printing unit 23 forms an image on a recording sheet based on the image data stored in the memory 21 and then ejects the sheet on which the image has been formed. The printing unit 23 is provided with, for example, a photosensitive drum, an electrifier which electrifies the photosensitive drum so as to have a predetermined potential, a laser writing unit which forms an electrostatic latent image on the surface of the photosensitive drum, a developing unit which applies toner onto the electrostatic latent image on the surface of the photosensitive drum to make a image appear, and a transcriber which transcribes the toner image on the surface of the photosensitive drum onto transfer paper (all of them are not shown). Incidentally, the type of the printing unit 23 is not limited to the electrophotographic type; any types such as a ink-jet type and a thermal transfer type can be used.

The communication unit 7 is provided with an interface for use in conducting communications with personal computers 201, an Internet facsimile machine 401, a mail server 402, etc. operating on a network 200, the Internet 400, and so on to which the digital multifunction machine 100 is connected (through the use of, for example, an electronic mail function, a FTP, and an Internet facsimile function). The communication unit 7 transmits image data read at the image reading unit 1, image data stored in HDD 6, or the like to the personal computers 201, the Internet facsimile machine 401, or the mail server 402. When the transmission has been completed, the communication unit 7 outputs a transmission completion signal to the control unit 4. And further, the communication unit 7 has a retransmission function of repeating transmissions to a destination (communicating party) under the control of the control unit 4. Still further, when the communication unit 7 has transmitted image data to a destination via the mail server 402 and then received from the mail server 402 transmission error information indicating that the destination is wrong, the communication unit 7 outputs a transmission incompletion signal to the control unit 4.

The FAX modem 8 is provided with a facsimile communication interface which incorporates a NCU, a modem, and so forth and which conducts facsimile communications with a facsimile machine 301 (a digital multifunction machine, or the like which is not shown) connected to a telephone network 300 to which the digital multifunction machine 100 is connected. The FAX modem 8 has a redialing function: when a transmission with a destination (communicating party) has not yet been completed, the destination is redialed under the control of the control unit 4, that is, the dialing is repeated up to a preset number of times (for example, five times) to conduct the communication with the facsimile machine 301 of the destination. When the transmission has been completed, the FAX modem 8 outputs a transmit completion signal to the control unit 4; on the other hand, when the transmission has not yet been completed despite the fact that the dialing has been conducted the preset number of times, the FAX modem 8 outputs a transmit incompletion signal to the control unit 4. And furthermore, when the FAX modem 8 detects that the number of the destination is busy, the modem 8 outputs a busy signal to the control unit 4.

The operating unit 9 is provided as, for example, a touch-sensitive operation panel and has an input unit 91 which accepts the operating instructions of users, a display unit 92 having a liquid crystal display which displays various kinds of information to the users, and so forth.

The storage unit 5 is comprised of a nonvolatile memory or a HDD and so on and stores destination information including the destination names, names, FAX numbers, telephone numbers, e-mail addresses, and so on of destinations to which data such as image data is to be transmitted and which are brought into correspondence with search characters, key items, indexes, and so forth. Destination information stored in the storage unit 5 is not only registered, updated (modified), or deleted by the operating unit 9 under the control of the control unit 4 but displayed by the display unit 92 with the touch of the one-touch button (not shown) of the operating unit 9, thereby a destination can be set (selected).

The control unit 4 is comprised of CPU and so forth and controls processing performed by the entire digital multifunction machine 100. And further, when a user performs operations such as the transmission of data at the operating unit 9, the control unit 4 makes the display unit 92 produce a screen display that prompts the user to enter his/her ID and password on the display screen, following which the input unit 91 performs authentication processing on the user according to whether or not the entered ID and password match up with those stored in the storage unit 5 in advance.

Figure 2:
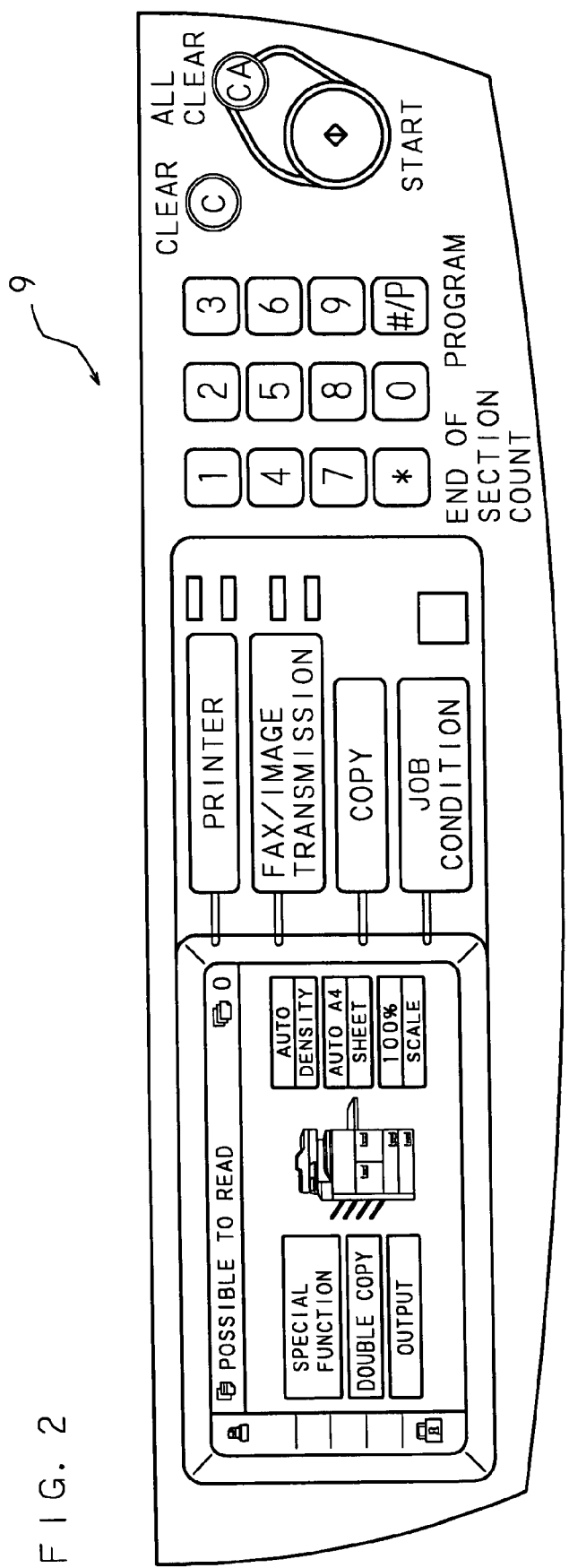
FIG. 2 is a schematic illustration of an example of an operation panel of an operating unit.

FIG. 2 is a schematic illustration of an example of the operation panel of the operating unit 9, and FIGS. 3 to 10 are each a schematic illustration of an example of the screen display. For example, when a user reads image data from a document and transmits the data to a destination needed, the authentication of the user is performed by pushing a "FAX/IMAGE TRANSMISSION" button on the operation panel shown in FIG. 2 and by entering his/her ID and password through the use of a ten-key pad.

Incidentally, in the authentication of users, IC cards in which personal data is recorded can be used instead of the system in which IDs and passwords are entered from the operation panel.

When the authentication of the user has been completed, a registration screen shown in, for example, FIG. 3 for use in registering destination information in advance is displayed on the display screen with the touch of the one-touch button (not shown). For example, a distinction between FAX and Internet FAX, the destination names, search characters, indexes, addresses (or FAX numbers), key items, and so forth can be inputted and registered as destination information.

Figure 4:
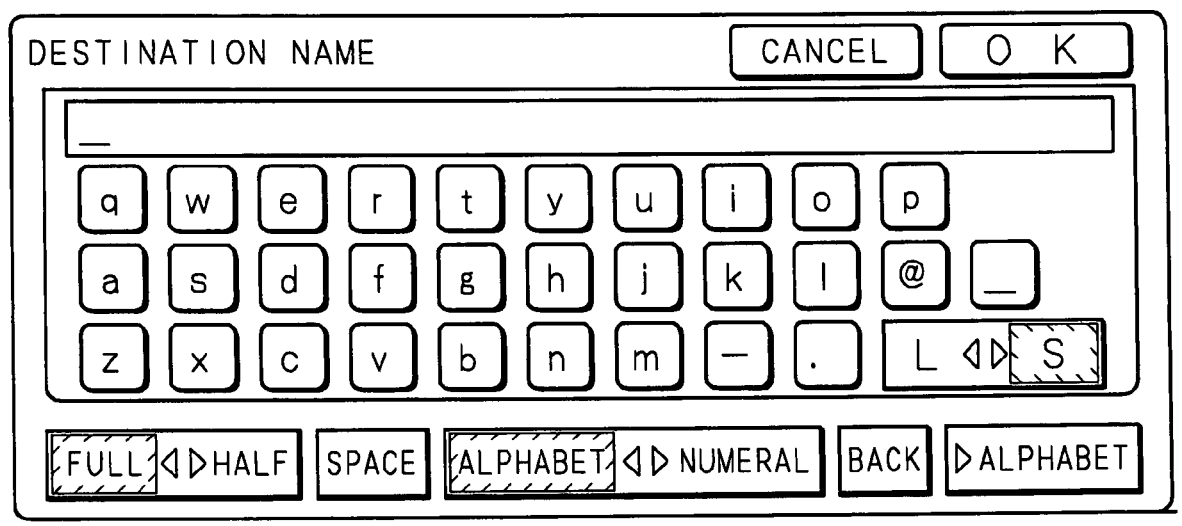
FIG. 4 is a schematic illustration of an example of a screen display.

When the input of characters such as the destination name is done, an input screen is displayed as shown in FIG. 4.

Figure 5:
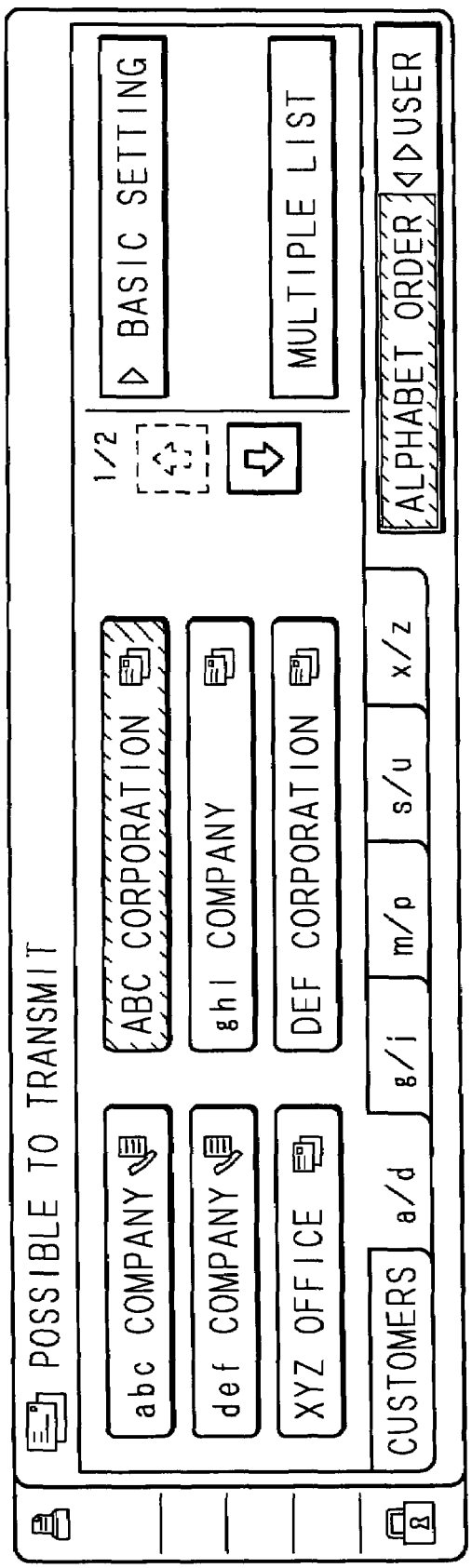
FIG. 5 is a schematic illustration of an example of a screen display.

When the user does not register destination information after the completion of the user authentication, a screen for use in selecting a destination from destination information registered and stored in advance is displayed as shown in FIG. 5, thereby the destination can be set with a one-touch operation. Therefore there is no need to input the character of the destination every time transmissions are made, and thus user convenience is increased.

In FIG. 5, the destination is set by selecting "ABC Corporation" from among displayed destinations, thereby image data is transmitted to "ABC Corporation".

Figure 6:
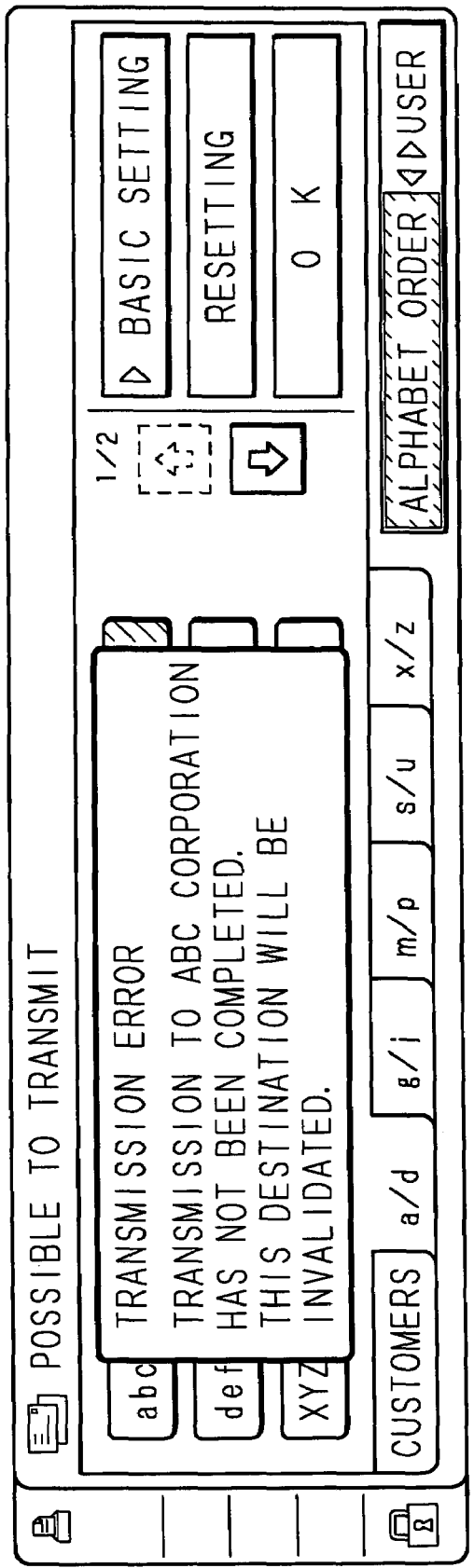
FIG. 6 is a schematic illustration of an example of a screen display.
Figure 7:
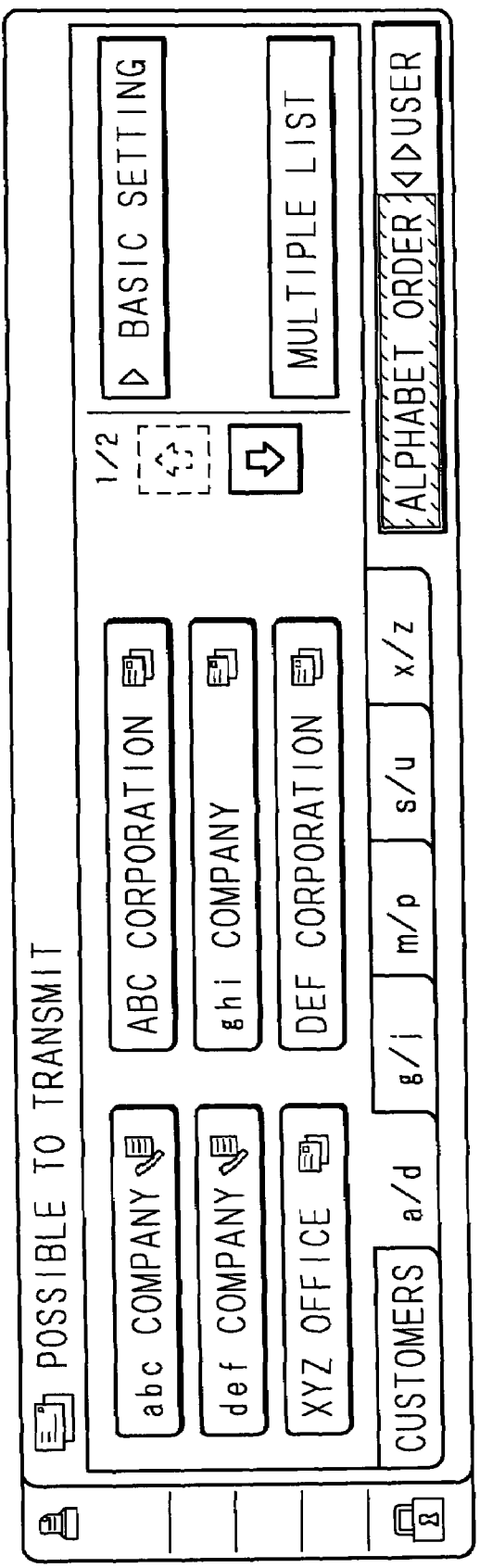
FIG. 7 is a schematic illustration of an example of a screen display.

When the transmission of image data has not been completed for any reason, a message appears saying that "Since the transmission has not been completed, the registered destination information will be invalidated (the transmission using the destination information will be inhibited)" as shown in FIG. 6. In addition, as shown in FIG. 7, sign "!" which indicates that the destination information has been invalidated appears on the right of the name "ABC Corporation".

When the user modifies the invalidated destination, the registered information is modified by displaying an editing screen shown in FIG. 8 as in the case of the display of the registration screen for use in the registration of destination information (see FIG. 3), and thus the destination information can be updated.

Incidentally, when the destination information is modified, the information is stored as valid (transmittable) data.

Figure 9:
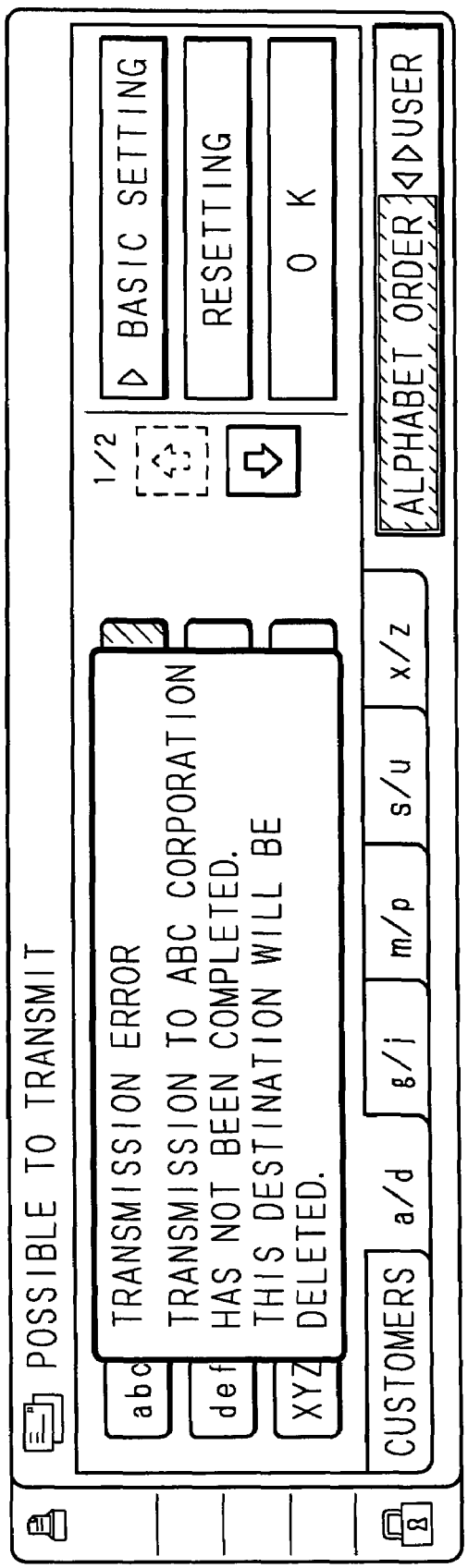
FIG. 9 is a schematic illustration of an example of a screen display.
Figure 10:
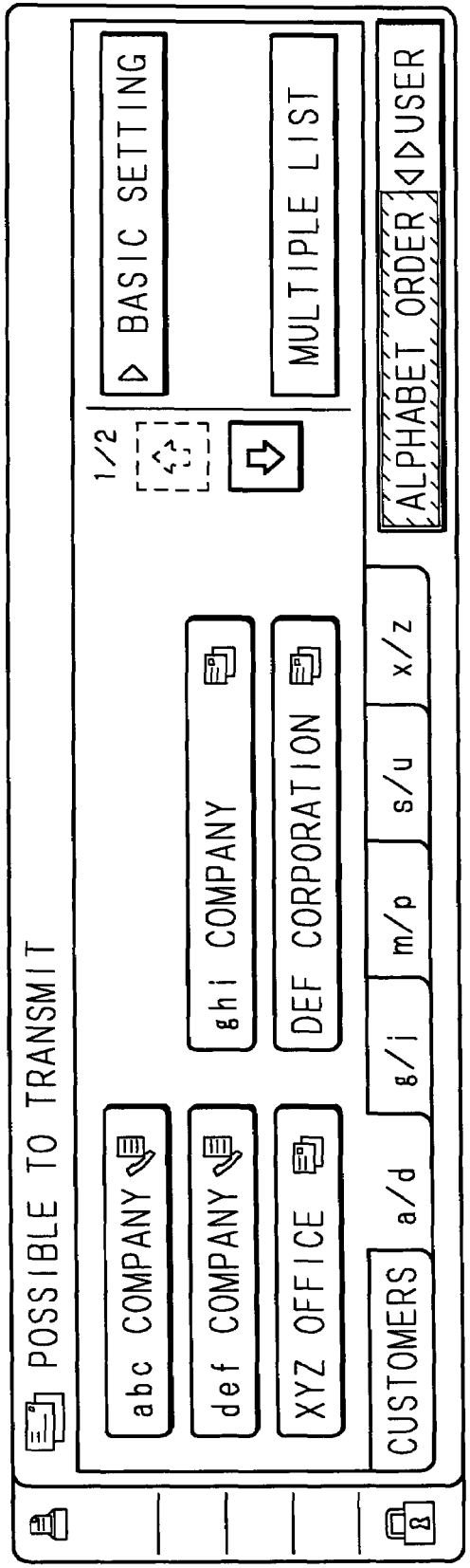
FIG. 10 is a schematic illustration of an example of a screen display.

On the other hand, when the user does not modify the invalidated destination, a message that "the registered destination information will be deleted" appears as shown in FIG. 9 and then the destination name "ABC Corporation" whose registration has been invalidated is deleted from the screen display as shown in FIG. 10, which makes it impossible to set (select) the destination. As a result, only valid destination information can be stored; for example, when information stored in an already provided digital multifunction machine is transferred to an additional or alternative digital multifunction machine, only valid destination information can be transferred thereto (registered therein), thereby user convenience is increased.

Figure 11:
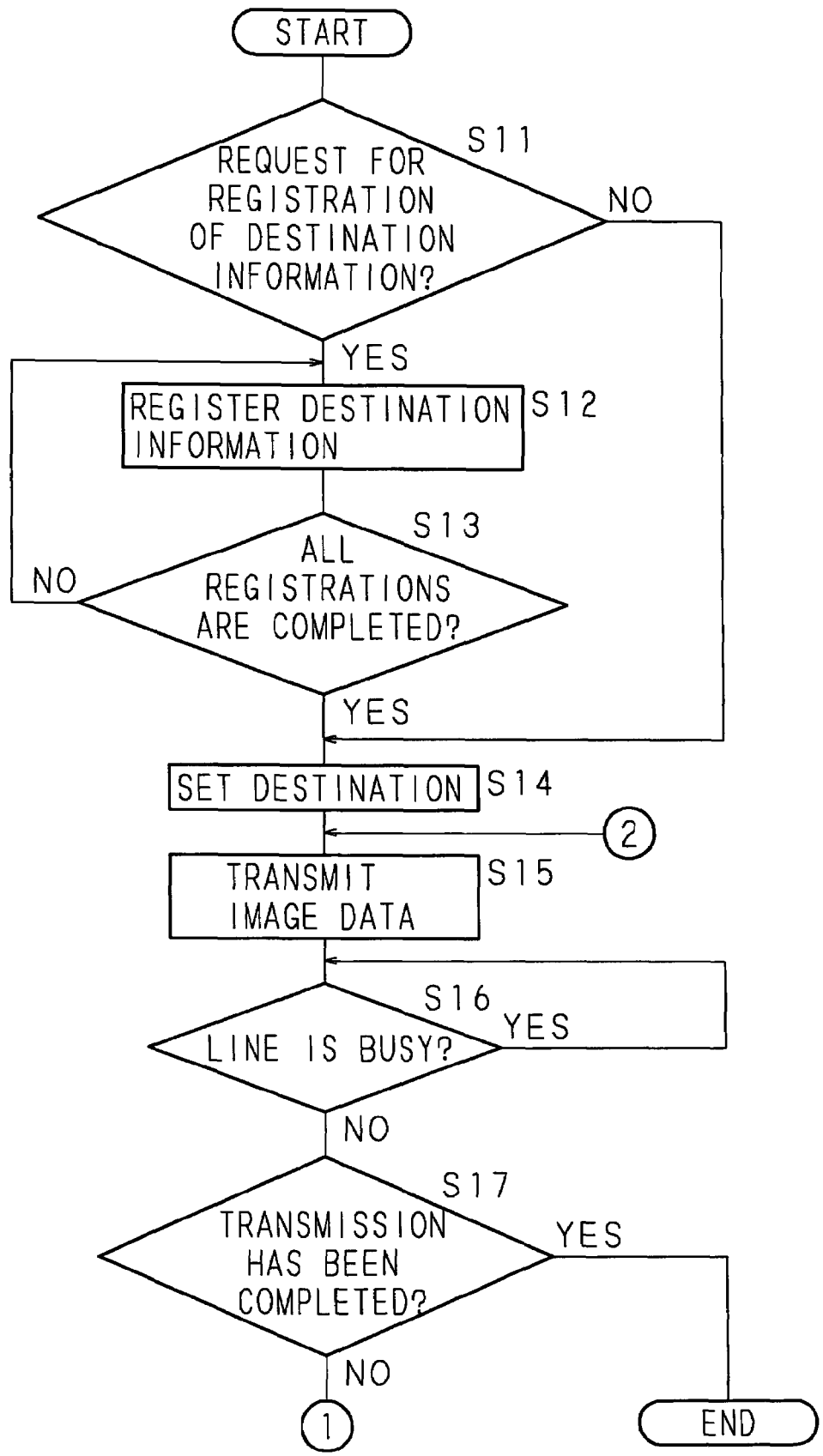
FIG. 11 is a flowchart of the procedure of processing performed by the digital multifunction machine.
Figure 12:
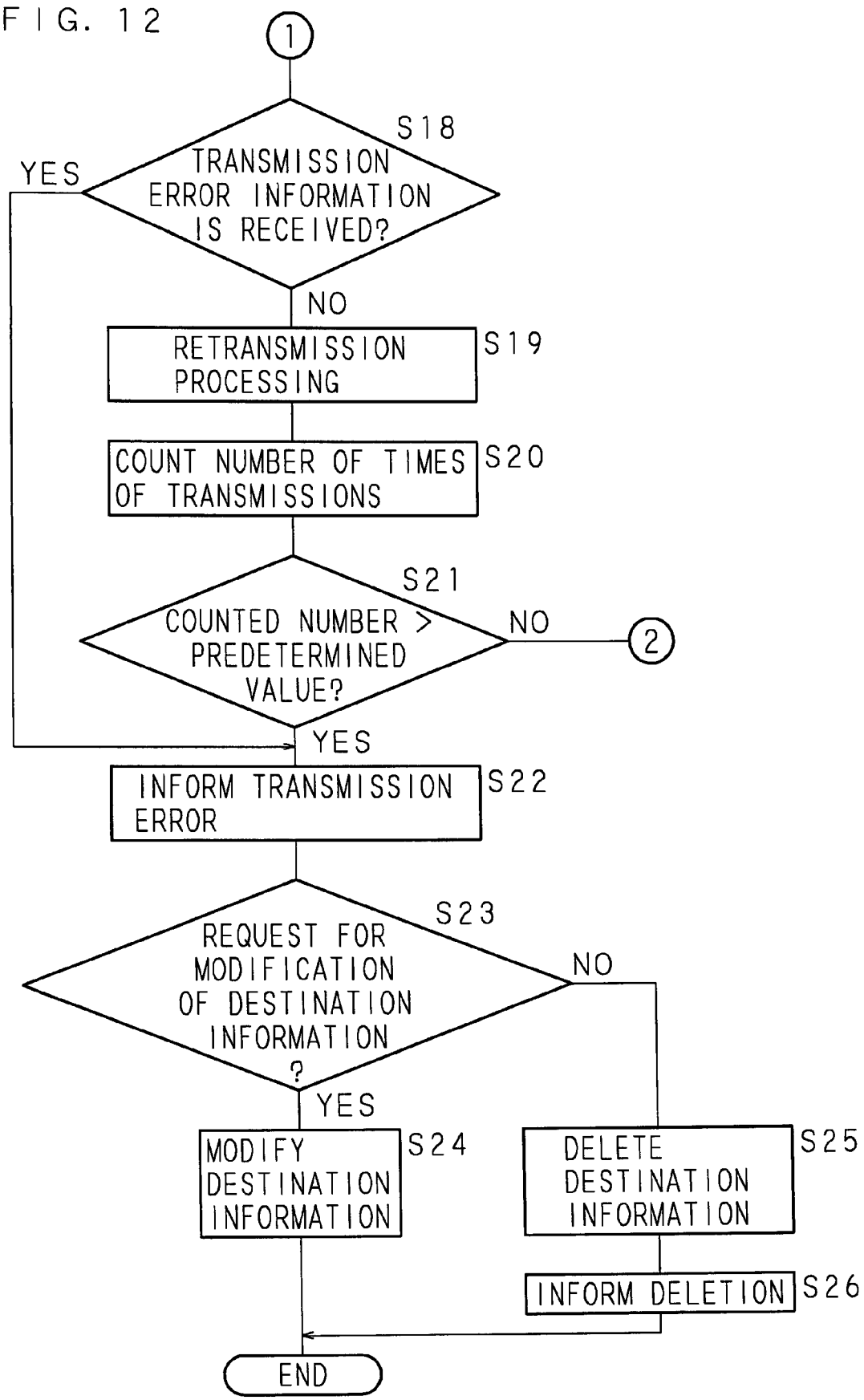
FIG. 12 is a flowchart of the procedure of processing performed by the digital multifunction machine.

Next, the operation of the digital multifunction machine 100 provided with the transmitting apparatus according to the invention will be described below. FIGS. 11 and 12 are each a flowchart of the procedure of processing performed by the digital multifunction machine 100 (control unit 4).

The control unit 4 determines whether the registration of destination information is requested from the operating unit 9 (step 11). When the registration is requested (YES in step 11), the destination information is registered (step 12) and then whether all the registrations are completed is determined (step 13). When all the registrations are not completed (NO in step 13), the control unit 4 continues the processing performed at step 12.

When all the registrations are completed (YES in step 13), the control unit 4 sets a destination through a selecting operation performed by the operating unit 9 (step 14) and then transmits image data to the destination thus set (step 15). On the other hand, when the registration of destination information is not requested (NO in step 11), the control unit 4 performs the processing from step 14.

The control unit 4 determines whether the line of the destination is busy (step 16). When the line is busy (YES in step 16), the control unit 4 stands by for the completion of the communication while continuing processing performed at step 16. When it is determined that the line of the destination is not busy (NO in step 16), the control unit 4 determines whether the transmission has been completed (step 17). When the transmission has not been completed (NO in step 17), the control unit 4 determines whether transmission error information is received (step 18).

When the transmission error information is not received (NO in step 18), the control unit 4 performs retransmission processing, that is, repeatedly transmits the image data to the destination (step 19) and the number of times the transmission has been performed is counted (step 20). The control unit 4 determines whether the number is higher than a predetermined value (step 21). When the number is higher than the predetermined value (YES in step 21), the display unit 92 informs the user of the occurrence of a transmission error (step 22).

When the number is lower than or equal to the predetermined value (NO in step 21), the control unit 4 continues processing from step 15. On the other hand, when the transmission error information is received (YES in step 18), the control unit 4 performs processing from step 22.

The control unit 4 determines whether a modification request for the destination information is made at the operating unit 9 (step 23). When the modification request is made (YES in step 23), the control unit 4 modifies the destination information (step 24) to end the processing. When the modification request is not made (NO in step 23), the control unit 4 deletes the destination information (step 25) and then informs the user that the destination information is deleted (step 26) to end the processing. On the other hand, when the transmission has been completed at step 17 (YES in step 17), the control unit 4 ends the processing.

According to the invention, when wrong destination information is stored, it is possible to prevent users as recipients from feeling displeasure by inhibiting the use of such destination information as described above. And further, when the transmission of image data has not been completed despite the fact that the transmission has been repeated a predetermined number of times and a transmission of the image data to the destination is inhibited, it can be determined that stored destination information is surely wrong. Still further, when transmission error information indicating that a destination is wrong is received, it is possible to prevent the user from repeatedly using the wrong destination information by inhibiting a transmission of image data to the destination. Furthermore, when the transmission of image data to a destination is inhibited, only correct destination information can be stored by providing the deleting unit which deletes wrong destination information. Moreover, when the line of a destination is busy, destination information is not deleted in order to make it possible to prevent correct destination information from being deleted by mistake. In addition, when the transmission of image data to a destination is inhibited, it is possible to make the user realize that wrong destination information is present by providing the informing unit which informs that a transmission is inhibited.

In the embodiment described above, the description of the transmitting apparatus according to the invention is presented by taking the digital multifunction machine as one example; however, the transmitting apparatus is applicable not only to digital multifunction machines but to equipments having communication function such as facsimile machines. And further, the type of data is not limited to image data; other types of data can also be used.

The screen displays presented in the embodiment described above are merely typical examples, and therefore displays on the screen of the display unit are not limited to those displays.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A transmitting apparatus, comprising:
   a storage unit which stores plural pieces of destination information including destinations of data;
   a selecting unit which selects a destination based on the stored destination information;
   a transmitting unit which transmits data to the selected destination;
   a determining unit which determines whether the transmission to the destination has been completed;

an inhibiting unit which inhibits a transmission to the destination after it is determined at the determining unit that the transmission has not been completed, and a deleting unit which deletes the stored destination information including the destination when the transmission to the destination is inhibited, but does not delete the destination information including the destination if a detecting unit detects that a line of the destination is busy, wherein when the transmission to the destination is inhibited, the destination information including the destination is modified.

2. The transmitting apparatus according to claim 1, further comprising a control unit which controls the transmitting unit in order to make retransmission at a time when it is determined at the determining unit that the transmission has not been completed;

wherein the inhibiting unit inhibits a transmission to the destination when the transmission has not been completed despite the fact that the transmission has been repeated a predetermined number of times.

3. The transmitting apparatus according to claim 1, further comprising a receiving unit which receives transmission error information indicating that a destination is wrong when data is transmitted thereto;

wherein the inhibiting unit inhibits a transmission to the destination when the receiving unit receives the transmission error information.

4. The transmitting apparatus according to claim 1, further comprising an informing unit which informs the inhibition of a transmission to the destination when the transmission is inhibited.

5. The transmitting apparatus according to claim 1, wherein the data is image data.

6. A transmitting method in which plural pieces of destination information including destinations of data are stored, a destination is selected based on the stored destination information, and data is transmitted to the selected destination, comprising the steps of:

determining whether the transmission to the destination has been completed;

inhibiting a transmission to the destination after it is determined that the transmission has not been completed; and deleting the stored destination information including the destination when the transmission to the destination is inhibited, but does not delete the destination information including the destination if a detecting unit detects that a line of the destination is busy, wherein when the transmission to the destination is inhibited, the destination information including the destination is modified.

7. The transmitting method according to claim 6, wherein when it is determined that the transmission has not been completed, a retransmission is made and when the transmission has not been completed despite the fact the retransmission has been repeated a predetermined number of times, a transmission to the destination is inhibited.

8. The transmitting method according to claim 6, wherein when data is transmitted to a destination, transmission error information indicating that the destination is wrong is received and when the transmission error information is received, a transmission to the destination is inhibited.

9. The transmitting method according to claim 6, wherein when a transmission to the destination is inhibited, it is informed that the transmission is inhibited.

10. The transmitting method according to claim 6, wherein the data is image data.

* * * * *